B. W. KING.
COUNTING SCALE.
APPLICATION FILED APR. 23, 1918.
1,330,593.  Patented Feb. 10, 1920.
2 SHEETS—SHEET 1.
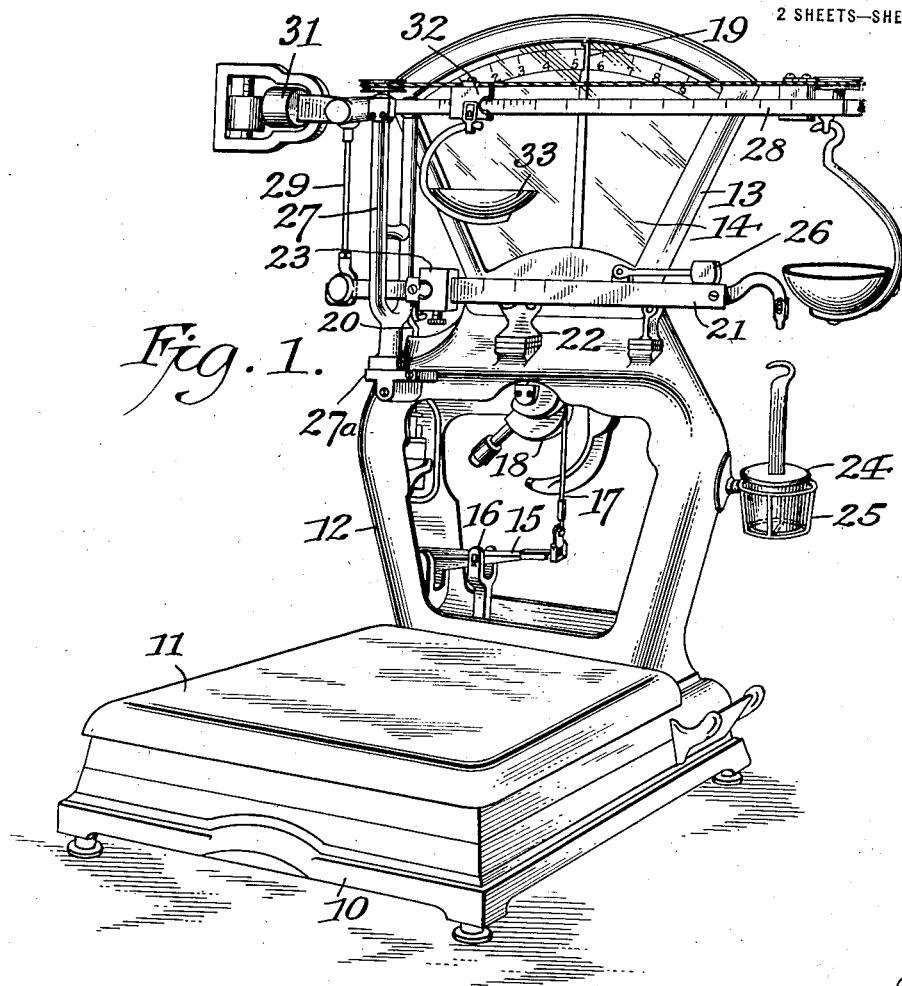
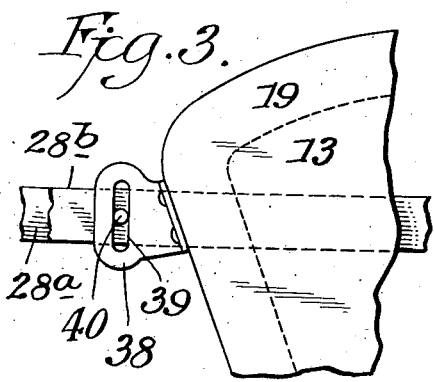
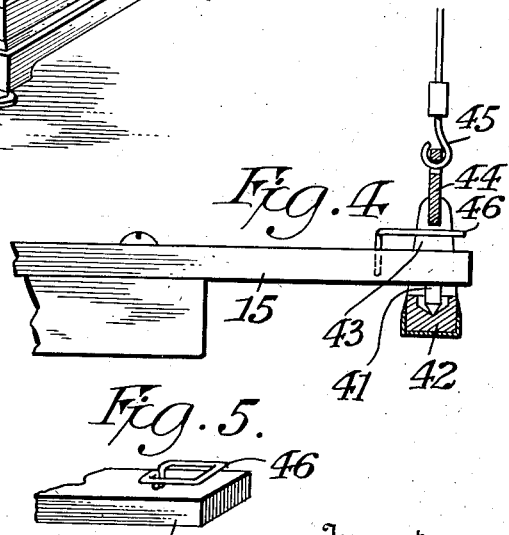
Inventor
B. W. King,
By his Attorneys
Kerr, Page, Cooper & Hayward

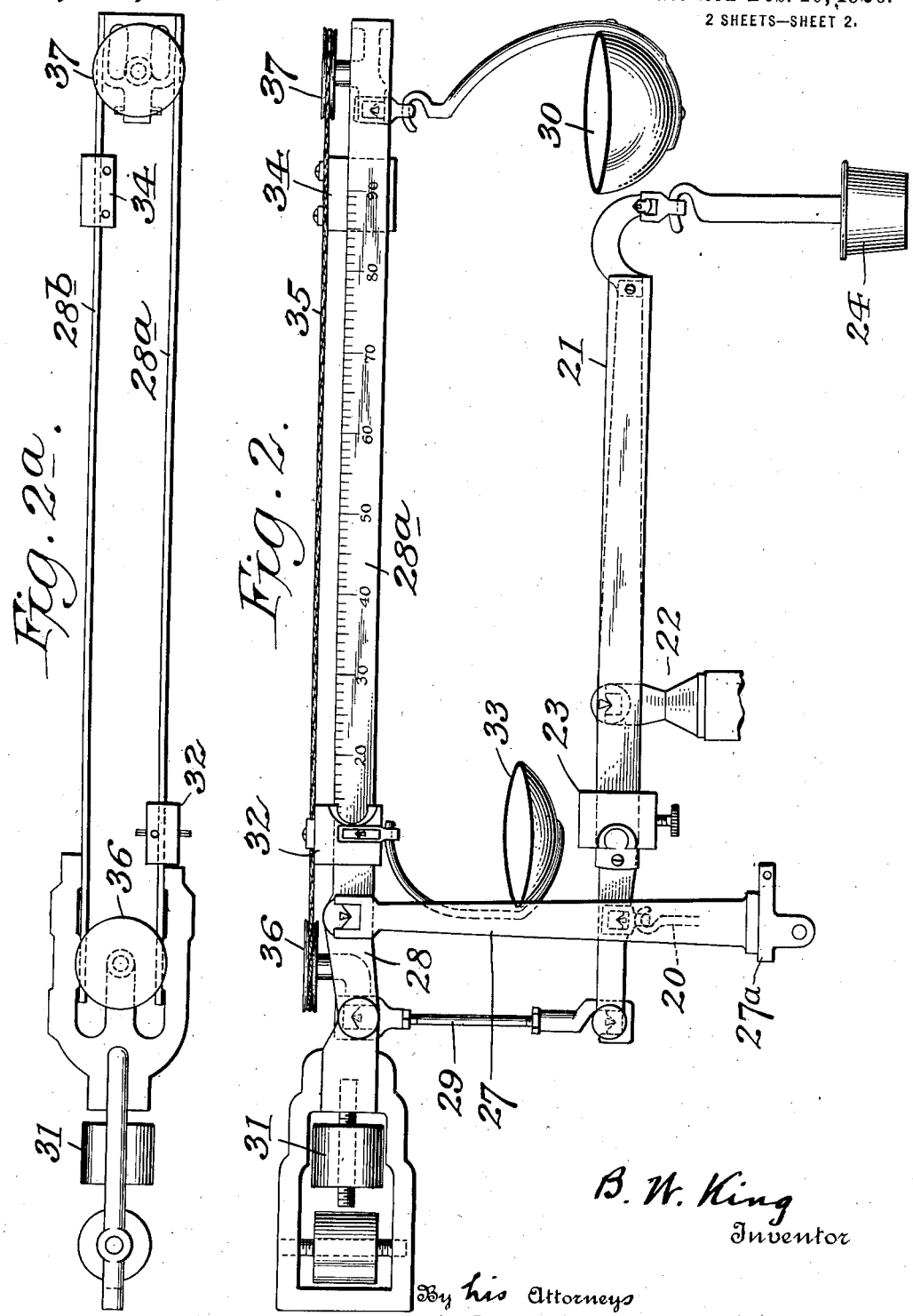

UNITED STATES PATENT OFFICE.

BERT W. KING, OF DETROIT, MICHIGAN, ASSIGNOR TO DETROIT AUTOMATIC SCALE COMPANY, OF ELKHART, INDIANA, A CORPORATION OF INDIANA.

COUNTING-SCALE.

1,330,593.   Specification of Letters Patent.   Patented Feb. 10, 1920.

Application filed April 23, 1918. Serial No. 230,223.

*To all whom it may concern:*

Be it known that I, BERT W. KING, a citizen of the United States, residing at Detroit, in the county of Wayne and State of Michigan, have invented certain new and useful Improvements in Counting-Scales, of which the following is a full, clear, and exact description.

This invention relates to so-called counting scales, by which a relatively large number or pile of small articles of one kind are balanced against a smaller number of articles of the same kind. Knowing the "weighing ratio" of the scale, it is then a simple matter to compute the number of articles in the larger pile. For example, the weighing ratio may be 100:1; that is, a unit weight in one pan will balance a weight of one hundred in the other. If it is then desired to count out, say, five hundred small articles, for instance five hundred bolts of a certain size, five bolts are placed in the pan on the longer arm of the scale and bolts are placed into the other until balance is attained. The number of bolts in the latter pan must therefore be five hundred. Evidently, if the ratio is fixed or invariable the number of articles on the shorter arm must always be an even multiple of the number of articles on the longer arm. For many purposes a fixed ratio, say 100:1, is satisfactory, but it is often desirable to count to numbers intermediate to successive multiples. Thus with a 100:1 ratio only even hundreds, as 100, 200, 300, etc., can be counted, whereas at times it may be desired to count numbers in between, as 125, or 241, etc. Accordingly one object of my present invention is to provide a counting scale having both a fixed and a variable ratio, the counting parts being so constructed and combined that numbers intermediate to successive multiples can be counted. Another object is to provide counting parts in the form of an attachment which can be applied to existing scales of a standard type, particularly certain scales manufactured by the Detroit Automatic Scale Co., of Detroit, Michigan. A further object is to provide a scale which can be used for counting or for ordinary weighing, at will. To these and other ends the invention consists in the novel features of construction and combinations of elements hereinafter described.

Of the various embodiments of which the invention is capable I have selected for specific illustration and description herein the one that at the present time is considered to exhibit the invention in its most convenient and effective form. This embodiment is illustrated in the accompanying drawings, and is there shown in connection with what is known as the Detroit Automatic Scale Co.'s No. 75 Scale.

Referring now to the drawings,

Figure 1 is a perspective view of the complete apparatus, as arranged and connected for counting.

Fig. 2 is a side view of the counting beam and the tare-beam, and connections.

Fig. 2ª is a plan view of the counting beam or lever.

Fig. 3 is a detail rear view showing the resilient trig loop provided to lessen shocks on the scale fulcrums or bearings.

Fig. 4 is a detail side view of the connection between the tape which actuates the indicator hand or index, and the lever which communicates there to the movement of the platform under the influence of the load on the latter.

Fig. 5 is a detail perspective view of the end of the lever which actuates the tape shown in Fig. 4, illustrating the yielding member provided to prevent accidental disengagement of the tape from said lever.

The scale comprises a base 10, having a platform 11, and a pedestal 12 surmounted by a fan-shaped chart housing 13 which incloses the usual computing and weight-indicating chart 14. Inclosed in the base is a suitable lever system (not shown) connected to the outer end of lever 15 of the first order, fulcrumed at 16. The inner end of this lever is connected, preferably as described hereinafter, to a tape 17 which coöperates with the usual eccentric segment or cam 18 to actuate the indicating hand 19 in a well understood manner. The base lever system is also connected, as by means of a link 20, to a scale lever 21 of the first order, fulcrumed on the standard 22 mounted on the outside of the pedestal 12. This lever or beam carries the usual sliding poise 23 and for ordinary weighing operations carries at its free end a detachable swinging weight 24. In the drawings the weight mentioned is shown detached and resting in its basket 25. The beam also carries a pivoted scoop-weight 26. When a scoop (not shown) is used on the platform the said weight 26 is swung over to its rightward position to counterbalance the scoop; but when the scoop is off, the weight is in its leftward position, as shown.

The parts described above constitute a regular weighing and computing scale and can be used for ordinary weighing and price-computing operations. In such cases the weight 24 is hooked to the beam 21. By shifting the poise 23, or adding weights to the pendent weight 24, or both, the weighing capacity of the scale can be increased beyond the indicating capacity of the chart 14, and tare can be allowed for in the same way, as will be readily understood. The lever 21 thus constitutes a tare beam as well as a regular weigh beam. The scale thus far described is the No. 75 scale manufactured by the Detroit Automatic Scale Company, of Detroit, Michigan, to which my present invention is assigned.

The operative parts of the counting attachment are carried by an upright forked standard 27, removably mounted on a bracket 27$^a$ fixed on the left-hand side of pedestal 12 at the front thereof. The adjacent end of the exposed tare-beam 21 extends through the arms of the fork at the bottom, as shown, and in the upper ends of the said arms is fulcrumed a counting beam or lever 28, of the first order, having its shorter arm releasably connected by a link 29 to the shorter arm of the tare (and weigh) beams 21. The longer arm of the counting beam carries cup 30 into which, in counting operations, a known number of articles is placed. This cup is preferably non-adjustable on the counting beam and the weighing (or counting) ratio between the articles in the cup and the articles on the platform is fixed, as will be readily understood. For this reason the cup mentioned can be conveniently termed the fixed-ratio cup. Preferably this ratio is made 100:1, as by proper proportioning the arms of the counting beam 28 and by extending the left arm of tare beam 21 so as to make of the latter a lever of the third order so far as the actuation of the counting beam is concerned. It will therefore be seen that each article placed in the fixed ratio cup 30 will balance 100 articles of the same kind on the platform 11. When the scale is used for counting the pendent weight 24 is detached from the beam 21. Preferably the weight of the parts supported by the longer arm of the counting beam 28 is such that "zero balance", with the said pendent detached and the link 29 connected to both beams, is not at the zero on the chart but at a higher graduation (which may then be conveniently termed the "counting zero") so that readings may be taken on either side. In the particular scale illustrated the parts are designed to put the counting zero at the center graduation, which happens to be the 5-pound mark, fine adjustment being effected by the screw-mounted balancing weight 31, as will be readily understood.

The counting beam 28, or at least the longer arm thereof, is made double, being formed of two parallel bars 28$^a$, 28$^b$, as clearly shown in Fig. 2. The front bar, 28$^a$, carries a sliding yoke 32 from which is suspended an article cup 33. When the latter, with an article in it, is shifted along the counting beam, the length of the longer arm of the beam is, in effect, varied. In other words the counting ratio is varied, and for this reason the cup 33 can be conveniently termed the variable-ratio cup. For the purpose of reading this ratio the bar 28$^a$ is graduated, as shown.

The other bar, 28$^b$, of the counting beam 28, carries a sliding poise 34 of the same weight as yoke 32 and cup 33, and the yoke and poise are connected to the respective reaches of an endless belt 35 running over pulleys 36, 37, mounted on the counting beam, so that as the yoke and cup are shifted in one direction the poise 34 is shifted to exactly the same extent but in the opposite direction. Hence the center of gravity of the shiftable parts, which is midway between the poise and the cup, is not shifted by the adjustment of said parts unless a weight (say an article of the kind which is to be counted) is placed in the cup. It will therefore be seen that the "tare," so to speak, of the variable-ratio cup 33, is automatically compensated, and the lever 28 is thus a tare beam as well as a counting beam.

The operation of the scale when used for counting will now be readily understood. Suppose, for example, that 563 screws are to be counted out. The weight 24 being detached from beam 21, five screws are placed in the fixed-ratio cup 30, one screw is placed in the variable ratio cup 33, and the latter is shifted to the 63 mark on the beam 28. Screws are now placed on the platform (in the scoop or other suitable receptacle if desired, the tare thereof being compensated by the scoop weight 26 or by adjustment of the tare poise 23) until the indicator or index 19 stands at the "counting zero," which, in the particular scale illustrated, is the 5-pound mark on the chart 14. There are then 563 screws on the platform; for 500 are required to balance the five in the fixed-ratio cup 30, and 63 more are required to balance the one screw in the variable-ratio cup 33. Or, suppose it is desired to know how many screws are in a certain lot. From his experience the operator estimates that there are, say, between 300 and 400 in the lot. He therefore puts 3 of the screws in the fixed-ratio cup and the rest on the platform, and finds that the scale is overbalanced, that is, the hand 19 passes beyond the counting zero; thus indicating, as was expected, that there are more than 300 on the platform. Taking another screw from the platform he places it in the variable-ratio cup 33 and moves the latter backward or forward on the beam 28 until balance (at the counting zero) is attained, and then notes that the yoke or slide 32 is at, say, the 44 mark on the bar 28ᵃ. He therefore knows at once that there are 44 more than 300 on the platform, making 344 in all on the platform. To this number he adds the 4 in the two ratio cups, making 348 as the total number of screws in the entire lot. If his estimate in the first place had been as much as a hundred too great, thereby getting an underbalance, he simply puts one or more additional screws into the fixed-ratio cup until an overbalance is attained. On the other hand, if his estimate is as much as a hundred too small, thereby getting too great an overbalance, he removes as many screws from the fixed-ratio cup as may be necessary and places them on the platform. In short, he counts the number of even hundreds in the lot by means of the fixed-ratio cup, and the units in excess of even hundreds by means of the variable-ratio cup.

In the scale illustrated the lowest graduation on the counting beam 28 is 10. That is, the lowest ratio obtainable is 10:1 and hence 10 articles is the minimum number that can be counted. Evidently the beam can be constructed to permit the variable-ratio cup to be brought, say, to one graduation space from the fulcrum of the counting beam, in which case the ratio could be as low as 1:1. But the structure is simplified by adopting a larger minimum, say 10:1 as in the present case, and no material disadvantage is introduced thereby, inasmuch as the counting of such small numbers of articles can be done by hand as conveniently, generally speaking, as by the use of the scale. For instance, if a number between 100 and 110, or 200 and 210, etc., is to be counted out, the hundreds are counted with the fixed-ratio cup and the additional 1 or 2 or more articles are counted by hand. It will also be observed that the highest graduation on the counting beam is 90, thus making 90:1 the maximum ratio obtainable by means of the cup 33 and leaving a gap in the counting operation between 90 and 100. In such case, to count out, for example, the number 293, three articles are placed in the fixed-ratio cup 30, and sufficient articles are placed on the platform to balance, after which the operator counts out and removes 7 of articles on the platform, thereby leaving the desired number, 293. Or, two articles can be placed in cup 30 and 1 in cup 33 and the latter then placed at the 90 mark. Articles enough to balance the scale are then placed on the platform, leaving 3 more to be added to make up the number, 293. Of course by constructing the beam to permit the variable-ratio cup to be brought nearer to the fixed-ratio cup a ratio of 99:1 or even 100:1 could be obtained by adjustment of the former, but the smaller maximum, say 90:1, is practically as convenient and the resulting simplification of structure is advantageous.

It will also be observed that unless he is actually using it in counting, the operator need pay no attention whatever to the position of the variable-ratio cup, 33. So long as this cup is empty it can be anywhere on the beam without affecting the results obtained with the fixed-ratio cup 30. This is an important advantage, as it eliminates what might be a fertile source of error.

If the scale is to be used for weighing purposes only, the counting attachment is omitted or removed. For occasional use for weighing, the link 29 is disconnected from the counting beam 28 and the pendent weight hooked to the tare beam 21. Or, without disconnecting the counting beam from the tare beam and attaching the pendent weight to the latter, the counting beam can be used for ordinary weighing. For instance, the article to be weighed being on the platform and the cup 30 empty, a unit weight, say one pound, is placed in cup 33. The latter is then shifted to the lowest pound mark which will carry the hand 19 past the 5-pound mark on the chart. The even pounds are now shown on the beam and ounces or fractions of a pound are shown on chart to the right of the counting zero,—in the present instance to the right of the 5-pound mark. Thus with an article weighing 50 pounds and 3 ounces, the 50 pounds would be shown on the beam and the hand 19 would indicate 3 ounces beyond the 5-pound line on the chart.

The swing of the counting beam 28 is limited by a trig loop 38, Fig. 3, fixed to the housing 13 and having a vertical slot 39 into which extends a stud 40 on the bar 28ᵇ. The trig loop is made of resilient sheet metal so as to yield slightly and thereby cushion the blow when the stud strikes the top or bottom of the slot, thus materially lessening the force of the shock transmitted to the beam pivots and correspondingly reducing the wear thereon. The slot in the cushion trig loop is of such length that when the stud 40 reaches the bottom the tape 17 is lowered far enough to wholly relieve the tension of the lever 15 thereon. To prevent unintentional disengagement of the tape and lever at such times, the connection between the two is constructed as shown in Figs. 4 and 5. The lever is provided with a downwardly extending pin 41 of hard steel, coöperating with a socket in an agate socket-piece 42 carried by the stirrup 43 which is itself hung by its bail 44 from the hook 45 on the tape. On top of the lever and fixed thereto is a horizontal loop of spring wire, spaced from the lever and extending under the aforesaid bail. Now when the tape and stirrup descend the bail strikes the spring loop or detent before the stirrup has dropped far enough to carry the socket-piece 42 below the point of pin 41 and thereby clear the same. Hence the two parts will not be disengaged though the pin is left out of contact with the agent or at most bearing very lightly thereon. Nevertheless the bail can be depressed manually against the tension of the spring loop far enough to permit entire disengagement of the parts whenever desired. It will therefore be seen that when the scale is not actually in operation for weighing or counting the connection between the lever 15 and the tape 17 is automatically relieved of all stress and hence is not subject to wear at such times, but that there is no danger of the tape and lever being disengaged.

Several important advantages result from combining an attachment of the kind described with an "automatic" scale, that is, a scale in which at least a part of the weight of the goods is indicated by a pointer or index traversing a graduated chart. For example, the operator, when using the counting attachment, is not required to pay any attention to the rocking of the beam. He simply watches the indicator, and when the latter reaches the counting zero he knows that the scale is in balance. This is a marked convenience and makes it possible to complete the counting operation more quickly than would otherwise be the case.

It is to be understood that the invention is not limited to the specific structure herein illustrated and described but can be embodied in other forms without departure from its spirit.

I claim:

1. The combination with an automatic scale having a tare-beam, of a counting beam, releasable means connecting the tare-beam and counting beam for simultaneous actuation, a variable-ratio receptacle shiftable on the counting beam, a poise shiftable on the counting beam, and a connection between the receptacle and the poise to cause equal but opposite movement of the poise when the receptacle is shifted on the counting beam.

2. A counting attachment for scale, comprising, in combination, a supporting member adapted to be mounted on a stationary part of the scale, a counting beam fulcrumed on and supported by said member, means for releasably connecting the beam to an operative part of the scale, a fixed-ratio receptacle carried by the beam, and a variable-ratio receptacle carried by the beam and shiftable thereon.

3. A counting attachment for scales, comprising, in combination, a supporting member adapted to be mounted on a stationary part of the scale, a counting beam fulcrumed on and supported by said member, means for releasably connecting the beam to an operative part of the scale, a variable-ratio receptacle carried by the beam and shiftable thereon, a poise shiftable on the beam, and means connecting the poise and the receptacle to cause equal but operative movement of the poise on the beam when the receptacle is shifted.

4. An attachment for a scale of the type described having a pedestal and a beam, the attachment comprising a standard adapted to be mounted upon the scale pedestal, a counting beam fulcrumed on the standard, a link carried by the counting beam to connect the same with the beam of the scale, a fixed-ratio receptacle carried by the counting beam, a variable-ratio receptacle shiftable on the counting beam, and means for automatically counteracting the effect of the weight of the variable-ratio receptacle when the latter is shifted.

5. An attachment for a scale of the type described having a pedestal and a pivoted beam of the first order, the attachment comprising a forked standard adapted to be mounted upon the scale pedestal to permit one arm of said beam to project through the standard, a counting beam fulcrumed on the standard above the counting beam, a depending link carried by the counting beam to connect the same with the beam of the scale projecting through said standard, a fixed-ratio receptacle carried by the counting beam, a variable-ratio receptacle shiftable on the counting beam, and means for automatically counteracting the effect of the weight of the variable-ratio receptacle when the latter is shifted.

6. In a scale, the combination with a platform to receive articles to be weighed, a pivoted beam, and other parts actuated by the platform, said other parts including two members loosely and releasably pivoted together, of a spring trig loop to limit the vibrations of the beam but permitting movement of the beam to such extent as would permit its engagement with said members, and yielding means associated with each other to prevent accidental disengagement of said members when the beam is checked, but permitting manual disengagement of said members.

In testimony whereof I hereunto affix my signature.

BERT W. KING.